May 20, 1947.     C. J. O'NEILL     2,420,794
OFFSET WHEEL CONSTRUCTION FOR TRAILERS
Filed May 11, 1946
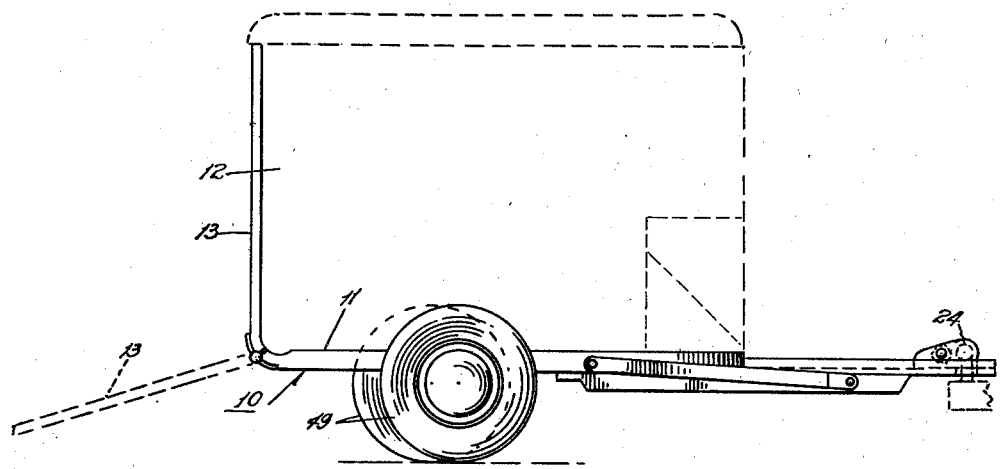
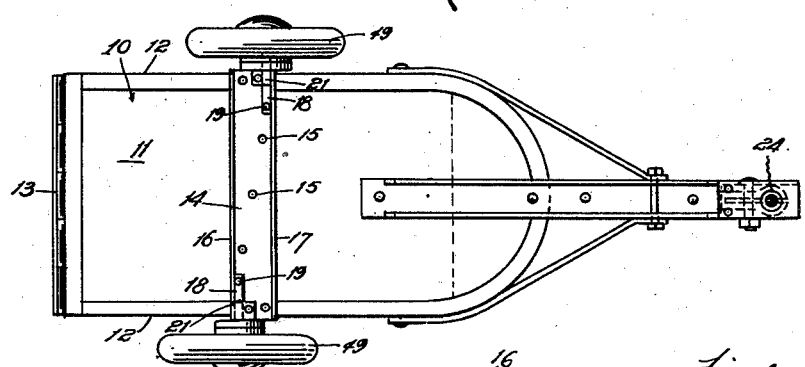
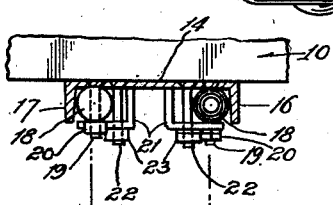
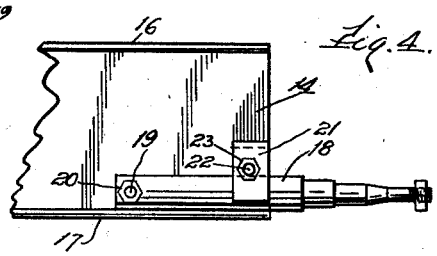
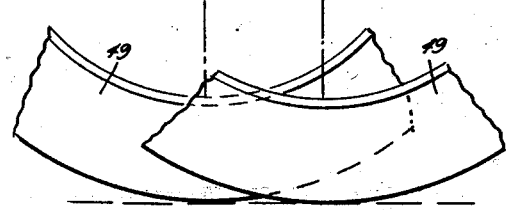
Inventor:
Charles J. O'Neill.

Patented May 20, 1947

2,420,794

UNITED STATES PATENT OFFICE 2,420,794

OFFSET WHEEL CONSTRUCTION FOR TRAILERS

Charles J. O'Neill, Manteno, Ill.

Application May 11, 1946, Serial No. 669,165

2 Claims. (Cl. 280—33.4)

My invention relates to a trailer for horses, or other livestock, in which the wheels are offset.

The prevailing type of trailer has its wheels on the same line. This causes a bobbing motion, to the great discomfort of the animals, as well as greater strain on the equipment.

It is among the objects of this invention to solve these problems and to provide a trailer which will eliminate the bobbing and provide comfortable transportation for the animals. My wheels are offset and thereby eliminate any bobbing or weaving. There is less strain on both the car and the trailer.

My invention also contemplates such other objects, advantages and capabilities as will later more fully appear and which are inherently possessed by my invention.

While I have shown in the accompanying drawings, a preferred form of my invention, yet I wish it understood that the same is susceptible of modification and change without departing from the spirit of my invention.

Referring to the drawings, Fig. 1 is a side elevational view of a trailer embodying my invention; Fig. 2 is a bottom plan view of my construction; Fig. 3 is an enlarged sectional view showing offset planes of the axle construction and wheels; and Fig. 4 is a plan view of my spindle and its attachment to the channel.

The embodiment selected to illustrate my invention comprises a trailer 10 having a floor 11, walls 12 for enclosing the trailer, and a droppable end ramp 13. My trailer has a suitable attachment 24 for engagement with an automobile, or other power driven vehicle. My trailer itself has no power for moving the same.

Extending across the under surface of floor 11 is my channel 14 of metal, or other suitable material. The channel 14 is attached to said floor 11 by suitable bolts 15.

Positioned against opposite flanges 16 and 17 of channel 14 are spindles 18. A single bolt 19 extends through the rear portion of each spindle 18, and through channel 14. A nut 20 removably holds each bolt 19 in position.

An L shaped clamp 21 contacts each spindle 18 at substantially its central portion, and also the channel 14. A bolt 22 extends through each clamp 21 and channel 14 and bears against each spindle 18. A nut 23 holds said bolt 22 in place.

The two spindles 18 extend beyond opposite ends of channel 14 and are longitudinally offset with respect to each other. Wheels 49 rotatably attached to the outer portions of said spindles 18 are also correspondingly offset with respect to each other.

In use, the wheels of my trailer do not cross the same portion of the road together. One wheel passes over a surface before the other wheel passes that surface. Where there are obstructions, or uneven surfaces, one wheel goes over them and then the other wheel. It is easier to pull one wheel over a raised portion at a time than to pull two wheels over at the same time.

Prior to my trailer, I found that trailers bobbed with a choppy up and down motion, imparted, at least in part, from the connection with the motor driven car ahead. This motion distressed the horses, or other animals, carried in the trailer. It also caused greater wear and strain on the car and trailer.

My offset construction not only eliminates this bobbing action, but prevents side sway or weaving. The saving of power and wear and tear, and the resultant comfort for the animals carried, has been substantially apparent.

Having thus described my invention, I claim:

1. In a trailer having a floor, a channel attached to the undersurface of said floor, and extending across the same, said channel having a downwardly extending flange on each of its sides, said flanges longitudinally spaced, a spindle attached to said channel at one end and contacting one of said flanges, another spindle attached to said channel at the other end and contacting the other of said flanges, and wheels rotatably mounted on said spindles.

2. In a trailer having a floor, a channel attached to the undersurface of said floor and extending across the same, said channel having side opposite flanges, a pair of spindles contacting opposite flanges and thereby longitudinally spaced, a single bolt extending through the rear portion of each spindle and said channel, an L shaped clamp contacting substantially the middle of each spindle and a bolt extending through each L shaped member and said channel and contacting the spindle for attachment of the spindle to the channel, each spindle adapted to rotatably receive a wheel.

CHARLES J. O'NEILL.

REFERENCES CITED

The following references are of record in the file of this patent:

UNITED STATES PATENTS

| Number | Name | Date |
|---|---|---|
| 1,642,823 | Ordway | Sept. 20, 1927 |
| 844,615 | Palmer | Feb. 19, 1907 |
| 1,170,172 | Litchfield | Feb. 1, 1916 |

FOREIGN PATENTS

| Number | Country | Date |
|---|---|---|
| 146,568 | Great Britain | June 18, 1920 |